J. A. BRANTLEY.
PROPELLING MECHANISM FOR VEHICLES.
APPLICATION FILED AUG. 31, 1918.
1,312,828.
Patented Aug. 12, 1919.
6 SHEETS—SHEET 4.
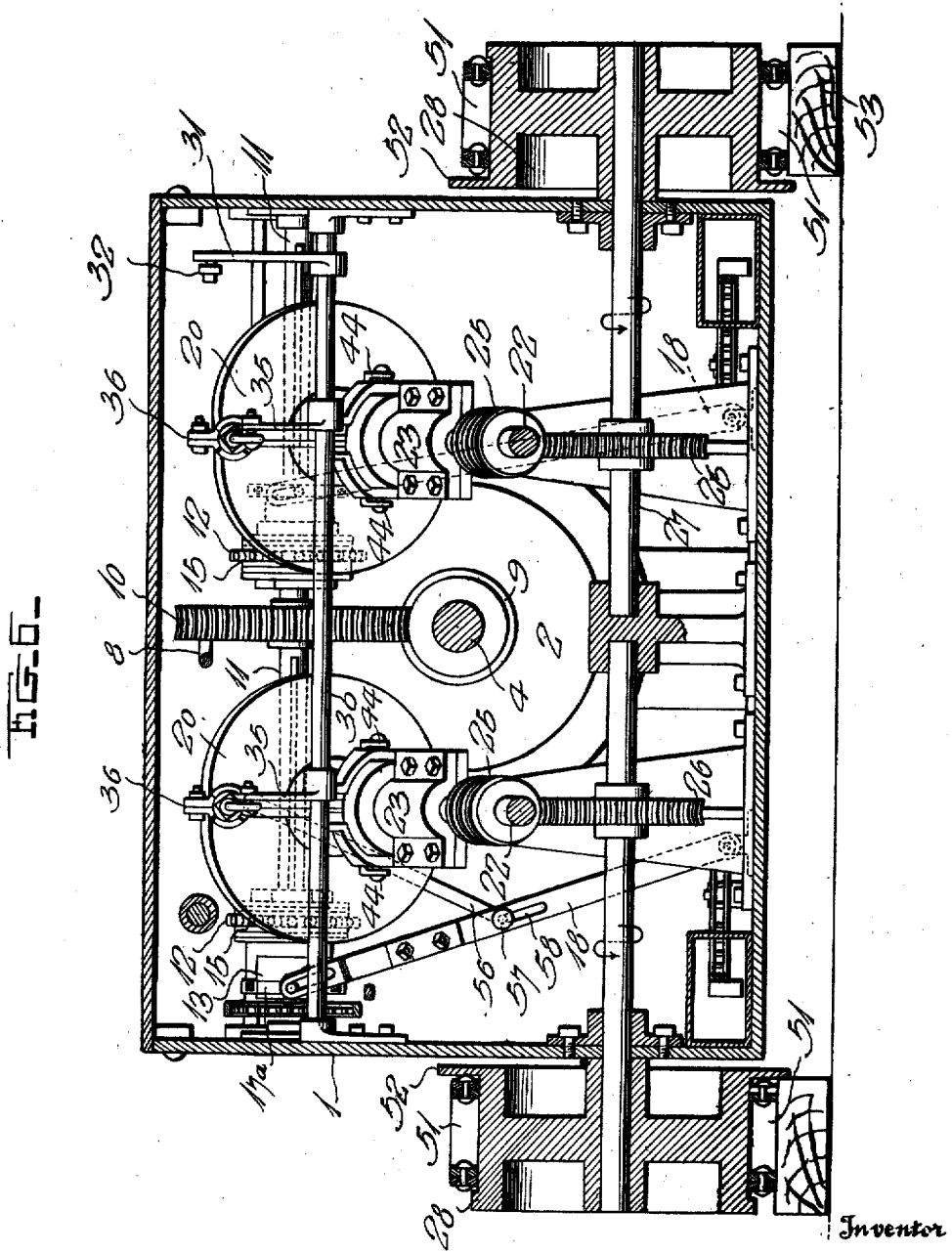

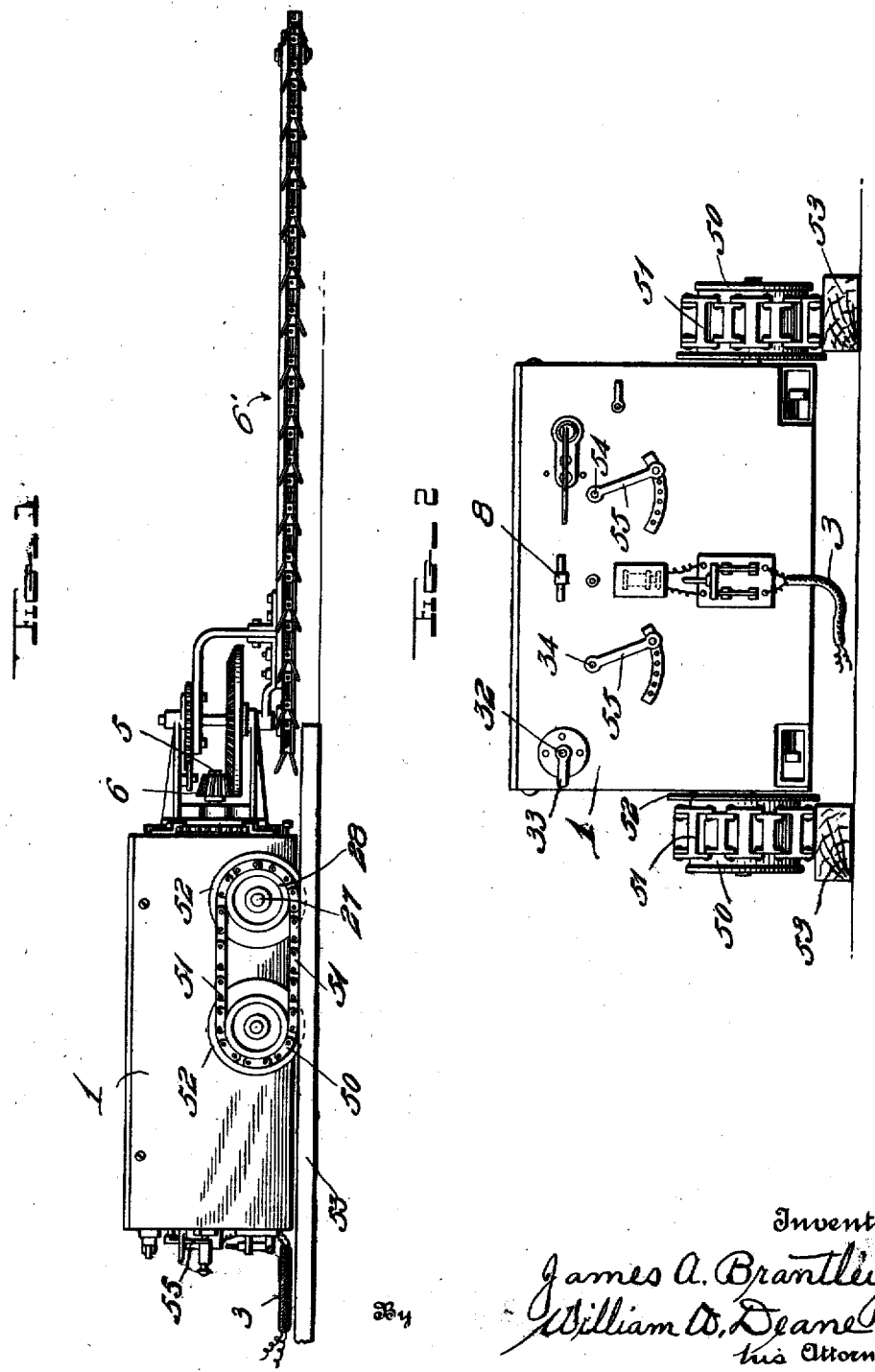

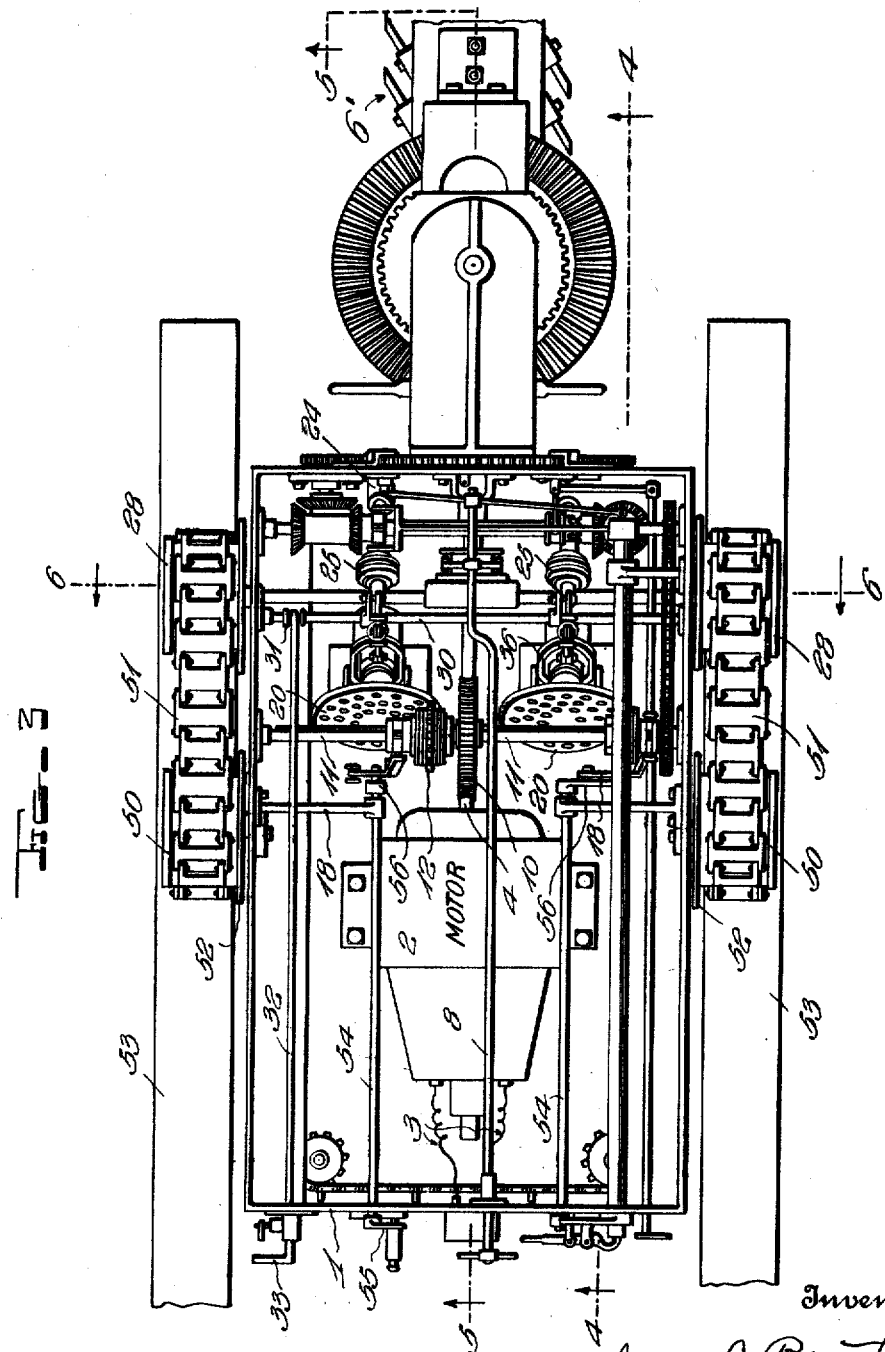

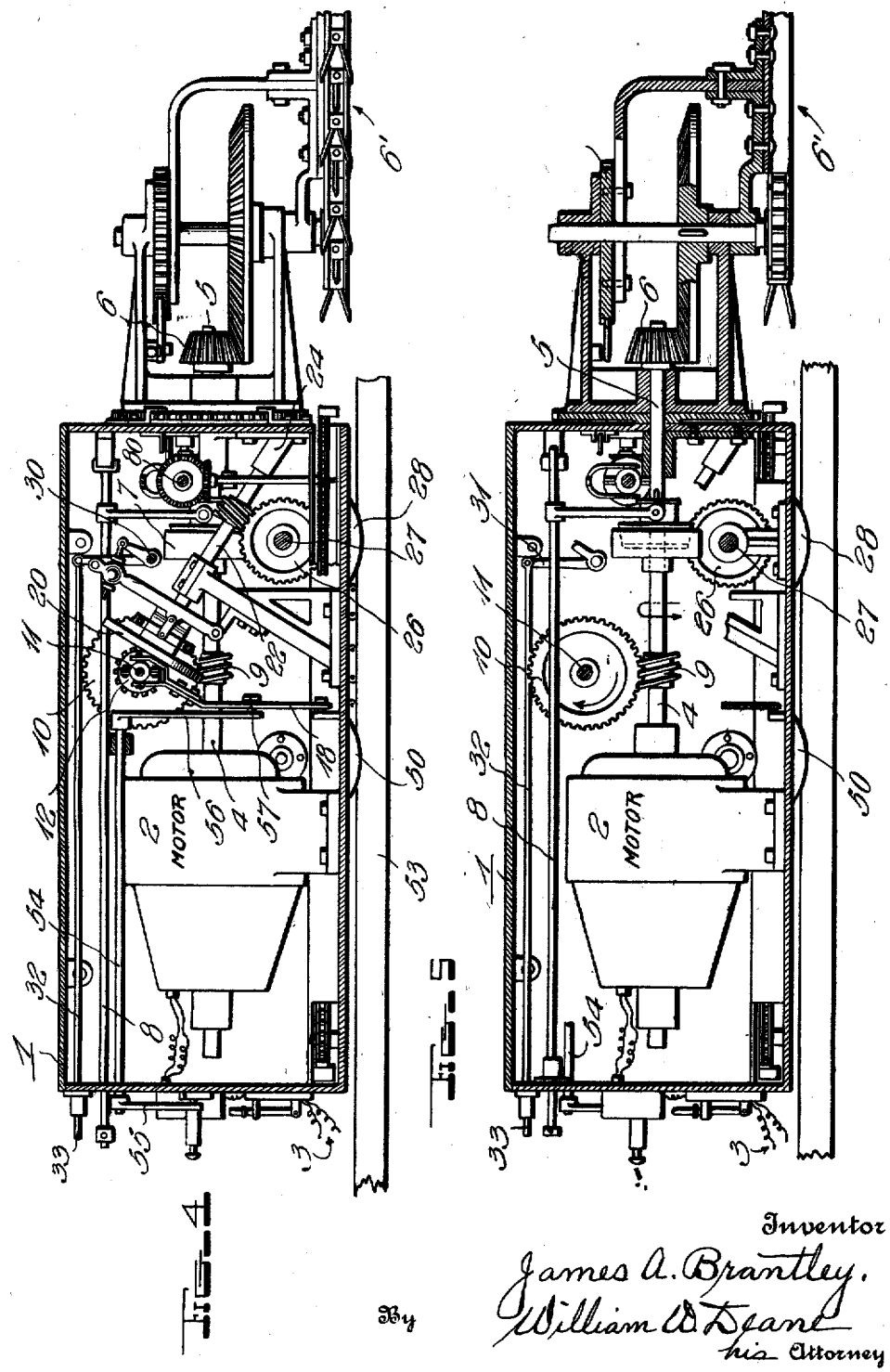

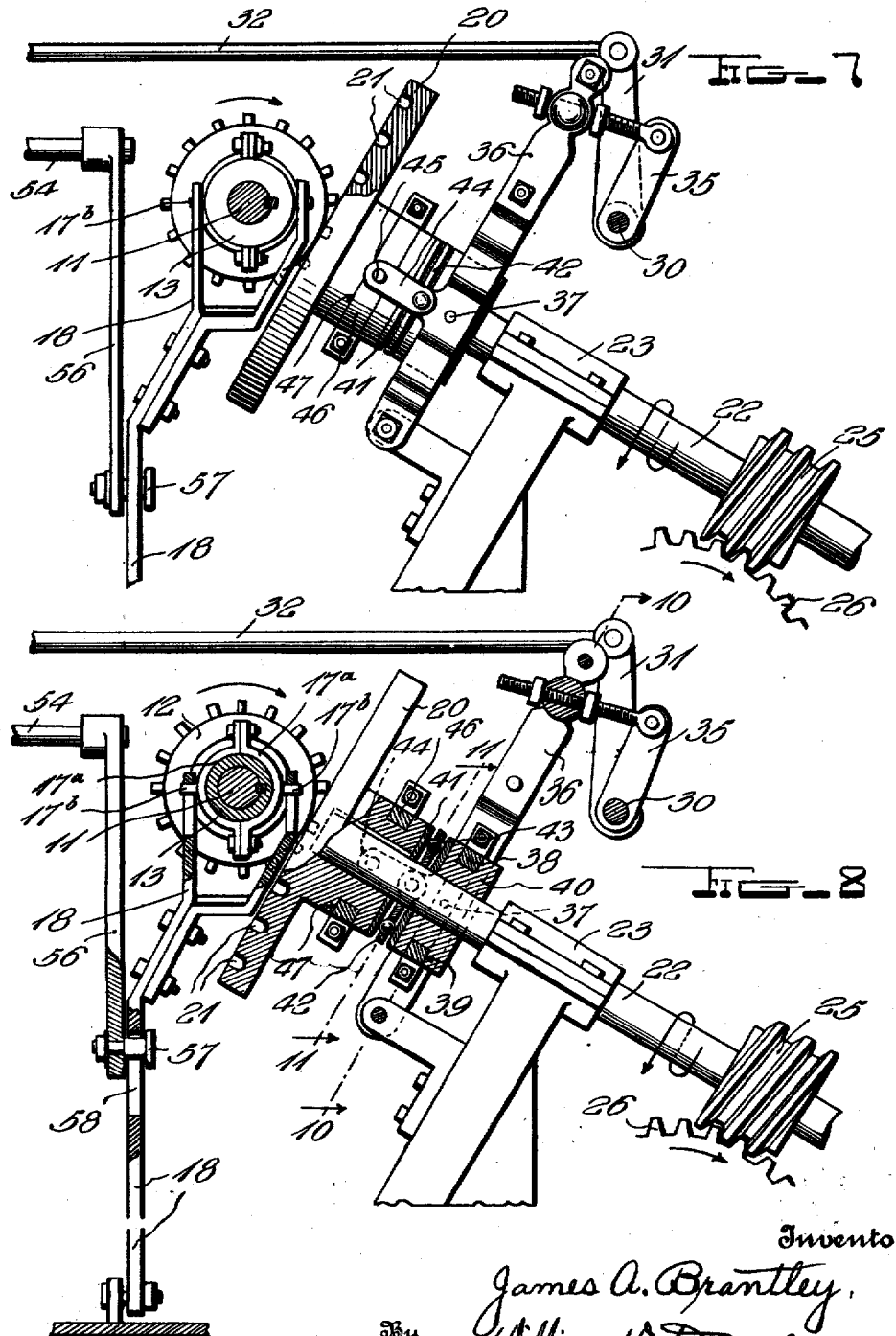

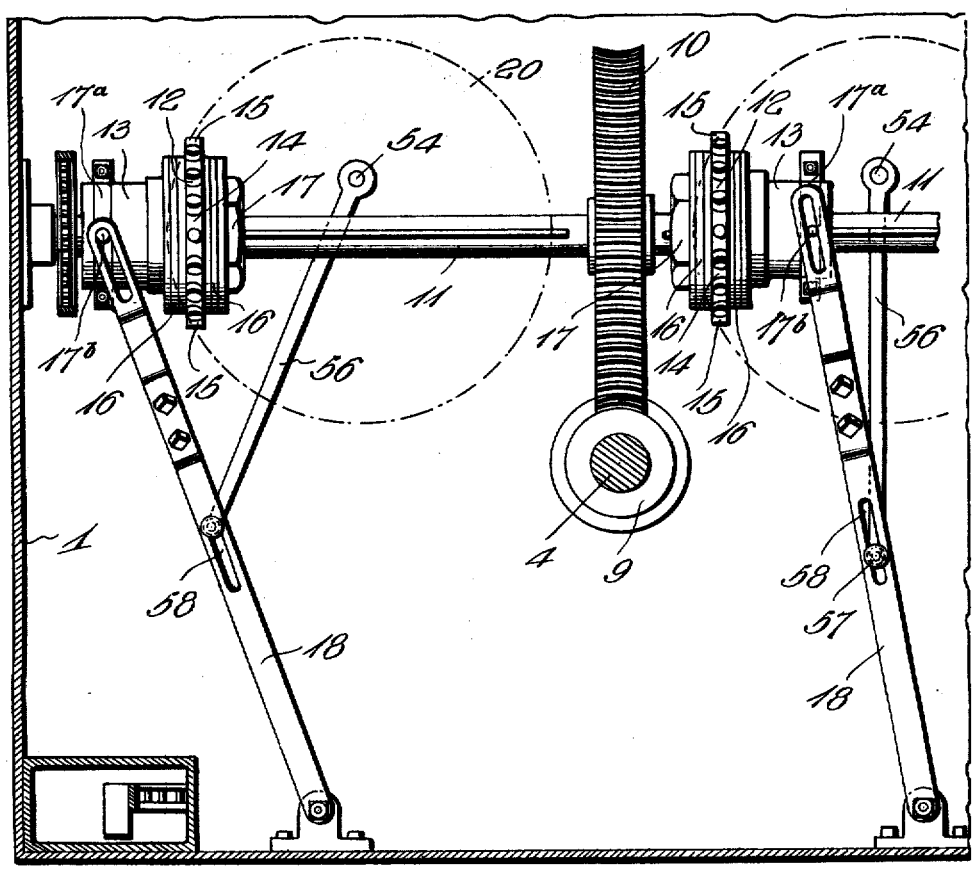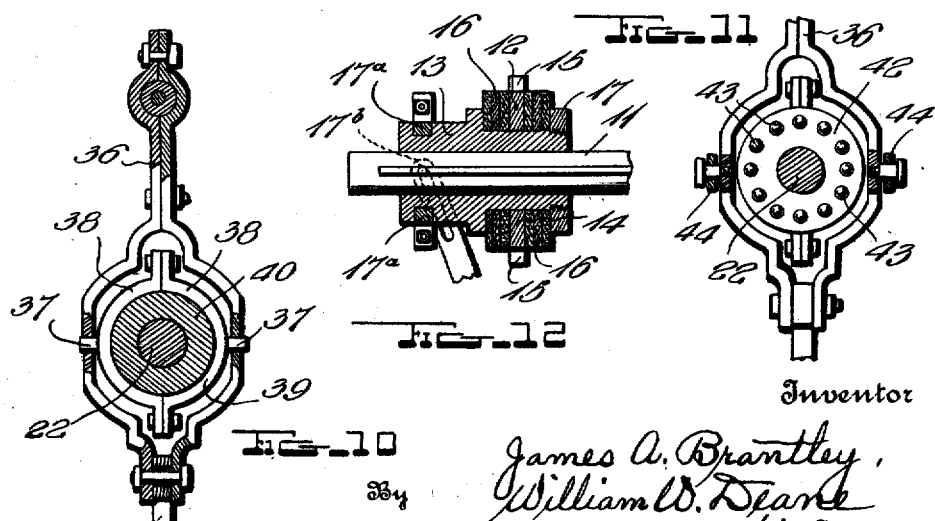

UNITED STATES PATENT OFFICE.

JAMES A. BRANTLEY, OF SAND SPRINGS, OKLAHOMA.

PROPELLING MECHANISM FOR VEHICLES.

1,312,828.     Specification of Letters Patent.     Patented Aug. 12, 1919.

Original application filed February 3, 1917, Serial No. 146,414. Divided and this application filed August 31, 1918. Serial No. 252,195.

*To all whom it may concern:*

Be it known that I, JAMES A. BRANTLEY, citizen of the United States, residing at Sand Springs, in the county of Tulsa and State of Oklahoma, have invented certain new and useful Improvements in Propelling Mechanism for Vehicles, of which the following is a specification.

The present invention relates to propelling mechanism for vehicles, and is particularly adapted for driving mining machines, while not necessarily restricted to this use.

An important object of the invention is to provide means of the above mentioned character, which is adapted to drive the vehicle at different speeds, and also to steer the same in different directions.

Other objects and advantages of the invention will be apparent during the course of the following description.

The subject matter of the present invention is shown and described in my co-pending application for mining machines, filed February 3, 1917, Serial No. 146,414, of which the present application is a division.

In the accompanying drawings forming a part of this specification, and in which like numerals are employed to designate like parts throughout the same, Figure 1 is a side elevation of the machine constituting the best practical embodiment of my invention that I have yet devised.

Fig. 2 is an enlarged rear elevation of the same.

Fig. 3 is a detail plan view with the top of the casing body removed.

Figs. 4 and 5 are detail longitudinal vertical sections taken in the planes indicated by lines 4—4 and 5—5 respectively, of Fig. 3.

Fig. 6 is an enlarged cross-section on line 6—6 of Fig. 3.

Figs. 7 and 8 are details hereinafter specifically referred to.

Fig. 9 is a fragmentary cross-section through the forward portion of the casing body.

Figs. 10, 11 and 12 are detailed sections; Figs. 10 and 11 being taken on the lines 10—10 and 11—11, respectively, of Fig. 8.

Similar numerals of reference designate corresponding parts in all of the views of the drawings.

Among other elements my novel machine comprises a casing-like body 1 which in common with the remainder of the machine is preferably constructed of steel or of metal compatible with its purpose.

Suitably supported and secured in the body 1 is an electric motor 2 which is the type of motor I prefer to employ.

I would have it understood, however, that in lieu of an electric motor, an internal combustion engine or any other kind of motor may be employed without involving departure from the scope of my invention as defined in my appended claims.

In the present embodiment of the invention the motor 2 is supplied with current through the trailing wires 3, Figs. 4 and 5, and the other appurtenances common to electric motors, which appurtenances are carried by the body 1 but need not be described in detail.

The armature shaft 4 of the motor extends forwardly from the remainder thereof, in the longitudinal center of the machine, and interposed between said shaft 4 and a shaft 5 which extends through the forward wall of body 1 and carries a pinion 6, is a clutch 7. This clutch 7 may be of any suitable construction, and is designed to be operated by a lever 8 located at the back of the body 1 through a connection which *per se* forms no part of my invention and is therefore not illustrated. The bevel gear 6 is employed to drive cutting means 6' of any well known or preferred construction.

On the armature shaft 4 of the motor is a worm 9, and intermeshed with and driven by said worm 9 is a worm-wheel 10, fixed on a transverse shaft 11, extending between and journaled in the side walls of the body 1. Mounted to slide on and turn with said shaft 11, at opposite sides of the worm-wheel 10, are combined friction and spur gears 12. These gears 12 respectively comprise a soft steel hub 13, (Fig. 12) feathered on the shaft 11, a central steel disk 14 loosely though snugly mounted on the hub 13 and having peripheral teeth 15, friction sections 16, of paper or fiber, loosely mounted on the hub 13 at opposite sides of the disk 14 and arranged with their smooth perimeters flush with the bottoms of the interdental spaces in the disk 14, and a nut 17 threaded on the hub 13 and adapted to tighten the disk 14 and the sections 16 against a flange on the hub. In the outer portions of the hubs 13 of the compound gears 12 are circumferential grooves in which are sectional rings 17ª having studs 17ᵇ disposed in upright bifurcated levers 18 through the medium of which the compound gears 12 are moved horizontally on the shaft. Each of the gears 12 is arranged back of and opposed to an inclined steel disk 20, and each disk 20 is provided in its face with three (more or less) circular series of indentures 21; the indentures of each series being spaced to receive the teeth 15 of the gears 12. The disks 20 are feathered on forwardly and downwardly inclined shafts 22, which are journaled in bearings 23, 24, in body 1 and are equipped with worms 25. The said worms 25 are intermeshed with worm-wheels 26, fixed on shafts 27 on which are also fixed the exterior drive and traveling wheels 28 of the machine.

In front of the disks 20 is a transverse shaft 30 on which is fixed an arm 31 to which is connected a rearwardly extending rod 32. This rod 32 is carried through the rear wall of the body 1, and is connected exteriorly of the body to a lever 33 at the rear end of body 1 which lever is designed to be actuated to move the disks 20 toward and from the compound gears 12. Any suitable means (not shown) may be employed to adjustably fix the lever 33 if such provision is deemed expedient.

Also fixed on the shaft 30 are arms 35. Connected with these arms 35, preferably in an adjustable manner, are yoke levers 36, and mounted at 37 in said yoke levers are studs on sectional rings 38 which are disposed in circumferential grooves 39 in steel members 40 loose on the shafts 22 and arranged back of the hubs on the disks 20. Between each of the said members 40 and each of the disk hubs are interposed a steel race annulus 41 and a steel ring 42 in which are anti-friction balls 43, interposed between the member 40 and the annulus 41 and adapted to lessen the friction when the disk 20 is thrust against its complementary gear 12. For the purpose of enabling each lever 36 to pull its respective disk 20 away from the coöperating gear 12, links 44 are pivoted to the sides of each lever 36. The rear portions of said links 44 receive pins 45 on a sectional ring 46 disposed in the circumferential groove 47 of the disk hub.

It being remembered that the traveling wheels 28 are fixed on the shafts 27 and that said shafts 27 are driven by their respective shafts 22 through the permanently intermeshed gears 25 and 26, it will be understood that the traveling wheels 28 will be rotated when the disks 20 are thrust and held against the gears 12 and will be permitted to remain at rest when the disks 20 are drawn and held away from the gears 12.

As before stated the gears 12 are adapted to be moved by levers 18 lengthwise of the shaft 11, and by so moving said gears 12 and changing their positions relative to the centers of the disks 20, the speed of the traveling drive wheels 28 can be varied. Again, when the gears 12 are moved across the centers of the disks 20 the direction of movement of the wheels 28 is reversed, but the same variations of speed are available as in the first instance. Moreover, it is to be noted that the said construction constitutes positive driving connections for the independent operation of the driving wheels 28, so that one wheel 28 may be turned forwardly and the other backwardly to facilitate turning of the machine as on a pivot; also, that the three series of indentures in each disk 20 afford positive driving connections at three different speeds forwardly or backwardly. I prefer to provide each disk with three series of indentures 21, but it is obvious that the number of the series may be increased or diminished in the discretion of the manufacturer of the machine without affecting my invention.

Mounted on spindles carried by the body 1 and disposed in rear of the wheels 28 are traveling wheels 50, and mounted on the said wheels 28 and 50 are caterpillar tractor belts 51. It will also be noticed that the wheels 28 and 50 are flanged, as indicated by 52 to enable them to hold to rails as 53 when it is desired to move the machine on a railway instead of on the ground.

For the purpose of moving the compound gears 12 relatively to the centers of the disks 20 I provide the longitudinal rock shafts 54 which extend through the rear wall of the body 1 and are provided immediately back of said wall with cranks 55 through the medium of which they may be turned about their axes; said cranks 55 being provided as shown with means for adjustably fixing the shafts 54 to body 1. At their forward ends said rock shafts are provided with arms 56. These arms are connected by pins 57 with the levers 18; the said pins being disposed and movable in slots 58 of the levers as illustrated.

Having thus described my invention what I claim is:

1. In a mining machine, the combination of a body, tractor wheels, a motor in the body, a transverse shaft connected with and driven by the motor, gears feathered on said shaft, shafts connected with the tractor wheels, disks feathered on said shafts and opposed to the gears, thrust bearings mounted on said shafts at the opposite sides of the disks, with reference to the gears, connections between said bearings and disks, means extending to the rear of the body for moving the gears, and means extending to the rear of the body for moving said thrust bearings.

2. In a mining machine, the combination of a body, tractor wheels, a motor in the body, a transverse shaft connected with and driven by the motor, gears feathered on said shaft, shafts connected with the tractor wheels, disks feathered on said shafts and opposed to the gears and having circular series of indentures in their faces, thrust bearings mounted on said shafts at the opposite sides of the disks, with reference to the gears, connections between said bearings and disks, anti-friction means interposed between the bearings and disks, means extending to the rear of the body for moving the gears, and means extending to the rear of the body for moving said thrust bearings.

In testimony whereof I affix my signature in presence of two witnesses.

JAMES A. BRANTLEY.

Witnesses:
J. S. NICHOLAS,
F. M. FOLEY.

Copies of this patent may be obtained for five cents each, by addressing the "Commissioner of Patents, Washington, D. C."